US011755971B2

(12) United States Patent
Kalyanam et al.

(10) Patent No.: US 11,755,971 B2
(45) Date of Patent: Sep. 12, 2023

(54) THRESHOLD BASED SELECTIVE MAINTENANCE OF SERIES-PARALLEL SYSTEMS

(71) Applicant: Novity, Inc., San Francisco, CA (US)

(72) Inventors: Krishna M. Kalyanam, Campbell, CA (US); Kai Goebel, Mountain View, CA (US); Ron Zvi Stern, Palo Alto, CA (US)

(73) Assignee: Novity, Inc., San Carlos, CA (US)

( * ) Notice: Subject to any disclaimer, the term of this patent is extended or adjusted under 35 U.S.C. 154(b) by 34 days.

(21) Appl. No.: 17/224,308

(22) Filed: Apr. 7, 2021

(65) Prior Publication Data

US 2022/0351106 A1 Nov. 3, 2022

(51) Int. Cl.
*G06Q 10/0631* (2023.01)
*G06Q 10/0633* (2023.01)
*G06Q 10/0639* (2023.01)
*G06N 7/01* (2023.01)

(52) U.S. Cl.
CPC ......... *G06Q 10/06312* (2013.01); *G06N 7/01* (2023.01); *G06Q 10/0633* (2013.01); *G06Q 10/0639* (2013.01); *G06Q 10/06313* (2013.01); *G06Q 10/06315* (2013.01); *G06Q 10/06316* (2013.01); *G06Q 10/063114* (2013.01)

(58) Field of Classification Search
CPC .......... G06N 3/00–20/00; G06Q 10/00–50/00
USPC ............................................... 705/7.11–7.42
See application file for complete search history.

(56) References Cited

U.S. PATENT DOCUMENTS

| | | | |
|---|---|---|---|
| 8,903,750 B1* | 12/2014 | Bodkin | G06N 7/01 706/14 |
| 11,106,190 B2* | 8/2021 | Huang | G06N 20/00 |
| 2008/0140361 A1* | 6/2008 | Bonissone | G05B 23/0283 703/2 |
| 2008/0234994 A1* | 9/2008 | Goebel | G06F 30/20 703/7 |
| 2009/0210081 A1* | 8/2009 | Sustaeta | H04L 67/125 715/702 |

(Continued)

OTHER PUBLICATIONS

Wu, Sze-jung, et al. "A neural network integrated decision support system for condition-based optimal predictive maintenance policy." IEEE Transactions on Systems, Man, and Cybernetics-Part A: Systems and Humans 37.2 (2007): 226-236. (Year: 2007).*

(Continued)

*Primary Examiner* — Alan S Miller
(74) *Attorney, Agent, or Firm* — Shun Yao; YAO LEGAL SERVICES, INC.

(57) ABSTRACT

A condition of an asset including one or more subsystems connected in series is monitored. Each subsystem includes one or more components connected in parallel. The asset has one or more jobs. A probability of the asset surviving a predetermined amount of time is determined based on the monitoring and one or more shared resources. The one or more shared resources are configured to be shared between the subsystems. A model is established using a threshold based heuristic maintenance policy. The model is configured to maximize a number of successful jobs that the asset is able to complete based on the determined probability. The one or more shared resources are allocated to the one or more subsystems based on the model.

18 Claims, 5 Drawing Sheets

(56) References Cited

U.S. PATENT DOCUMENTS

| | | | | |
|---|---|---|---|---|
| 2010/0017241 A1* | 1/2010 | Lienhardt | .............. | G06Q 10/00 |
| | | | | 702/184 |
| 2011/0246093 A1* | 10/2011 | Wood | .................... | G06F 11/008 |
| | | | | 702/182 |
| 2014/0156584 A1* | 6/2014 | Motukuri | ............... | G06Q 10/06 |
| | | | | 706/52 |
| 2014/0257526 A1* | 9/2014 | Tiwari | .................. | F01K 23/068 |
| | | | | 700/29 |
| 2017/0205818 A1 | 7/2017 | Adendorff et al. | | |

OTHER PUBLICATIONS

Patra, Sunandita. Acting, Planning, and Learning Using Hierarchical Operational Models. Diss. University of Maryland, College Park, 2020. (Year: 2020).*

Ahadi et al., "Approximate Dynamic Programming for Selective Maintenance in Series-Parallel Systems", IEEE Transactions on Reliability, vol. 69, Issue 3, Sep. 2020, pp. 1147-1164.

Meuleau et al., "Solving Very Large Weakly Coupled Markov Decision Processes", Proceedings of the 15th National/Tenth Conference on Artificial Intelligence, Jul. 1998. pp. 165-172.

* cited by examiner

THRESHOLD BASED SELECTIVE MAINTENANCE OF SERIES-PARALLEL SYSTEMS

SUMMARY

Embodiments described herein involve a method comprising monitoring a condition of an asset comprising one or more subsystems connected in series. Each subsystem comprises one or more components connected in parallel. The asset has one or more jobs. A probability of the asset surviving a predetermined amount of time is determined based on the monitoring and one or more shared resources. The one or more shared resources are configured to be shared between the subsystems. A model is established using a threshold based heuristic maintenance policy. The model is configured to maximize a number of successful jobs that the asset is able to complete based on the determined probability. The one or more shared resources are allocated to the one or more subsystems based on the model.

Embodiments involve a system comprising a processor and a memory storing computer program instructions which when executed by the processor cause the processor to perform operations. The operations comprise monitoring a condition of an asset comprising one or more subsystems connected in series. Each subsystem comprises one or more components connected in parallel. The asset has one or more jobs. A probability of the asset surviving a predetermined amount of time is determined based on the monitoring and one or more shared resources. The one or more shared resources are configured to be shared between the subsystems. A model is established using a threshold based heuristic maintenance policy. The model is configured to maximize a number of successful jobs that the asset is able to complete based on the determined probability. The one or more shared resources are allocated to the one or more subsystems based on the model.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
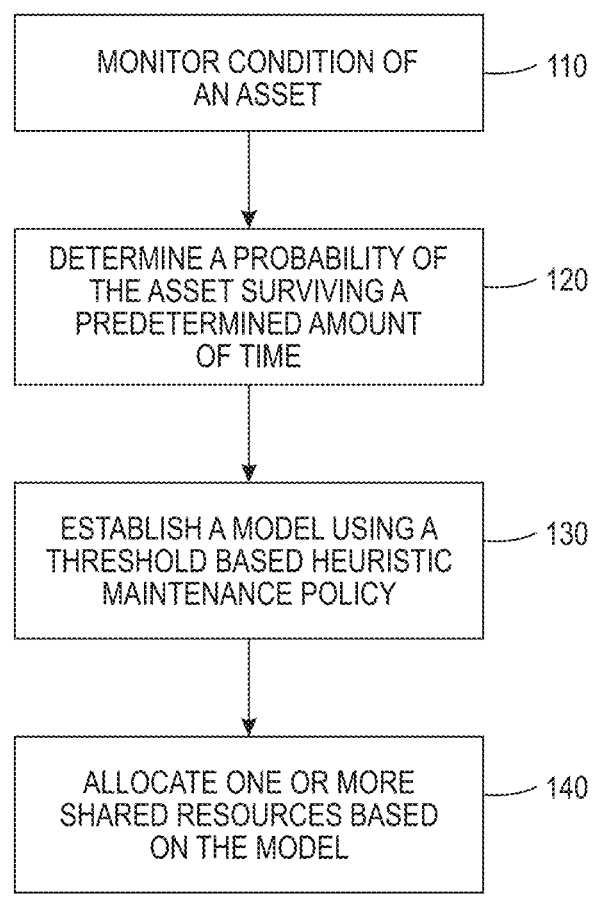
FIG. 1A shows a process for allocating resources using a threshold based heuristic system in accordance with embodiments described herein.

Industrial and mission critical assets such as factory assembly lines, aircraft engines and military equipment are composed of series-parallel systems that require periodic maintenance and replacement of faulty components. The assets typically operate over a finite time window and are brought in (or shut down) for service between consecutive operational windows (e.g., missions). To prevent excessive down times and costly breakdown, a selective maintenance policy that judiciously selects the sub-systems and components for repair and prescribes allocation of resources may be used.

Embodiments described herein involve a threshold based system and method that provides near optimal maintenance policy especially when resources (man power, budget, spare parts) are sparse and have to be shared across the entire planning horizon. The exact planning problem is computationally intensive and our heuristic method will produce near optimal maintenance schedules in reasonable time suitable for practical applications. The threshold value is expressed as the long-term expected maximum reward yielded by holding a single resource in reserve. The heuristic policy described herein determines threshold values that are a function of the resource inventory levels and state of the system. If the immediate reward yielded by allocating a resource exceeds the long-term expected marginal yield (e.g., the threshold value), the policy dictates that the resource be allocated. In this regard, we perform a tradeoff between the immediate reward and the long-term expected reward yielded by holding the resource in reserve (i.e., for allocation at a future time). If a plurality of resources are available, the policy dictates that the resource with the maximum marginal reward be allocated first. Also, if a plurality of sub-systems/components are in need of repair, the policy dictates that those sub-systems/components whose repair will yield the maximum asset reliability be repaired first. Embodiments described herein can be used in any type of system. For example, the techniques described herein can be used in aircraft engine maintenance, assembly line selective maintenance (e.g., in printer ink facilities), industrial equipment, military asset management, and/or weapons allocation (e.g., assignment of weapons to targets).

In some cases, finite resources are typically allocated for each service period (or break). Embodiments described herein specifically include allocation of scarce resources across the planning horizon. In general, consumable resources, (e.g., man hours, parts) can be shared and therefore optimally assigned depending on the condition of the asset and the remaining number of missions (time horizon). The selective maintenance scheduling problem for series-parallel systems is computationally intensive and optimal schedules may take hours to compute on current day edge devices. Embodiments described herein exploit the structure in the problem to derive an intuitive threshold based heuristic policy that is amenable to fast real time implementation. The heuristic policy employs a scalable linear backward recursion for computing the threshold values as opposed to solving a non-linear Bellman recursion (which is typically not scalable for a system with large number of sub-systems and components) for computing the optimal allocation.

FIG. 1A shows a process for allocating resources using a heuristic threshold-based system in accordance with embodiments described herein. A condition of an asset comprising one or more subsystems connected in series is monitored 110. For example, the monitoring 110 may involve determining if all subsystems are functioning properly. Each subsystem has one or more components connected in parallel. One or more of the components may be redundant within each subsystem. In some cases, all of the one or more components are redundant within each subsystem. According to various embodiments, the asset has one or more jobs. According to various embodiments the one or more jobs comprise one or more identical jobs.

A probability of the asset surviving a predetermined amount of time is determined 120 based on the monitoring 110 and one or more shared resources configured to be shared between the subsystems. The shared resources may include one or both of replenishable resources and consumable resources. Specifically, the one or more shared resources include one or more of man hours, budget, parts, and equipment used to perform maintenance.

A model is established 130 using a threshold based heuristic maintenance policy. The model may be configured to maximize a number of successful jobs that the asset is able to complete based on the determined probability. According to various embodiments, the model is configured to minimize a shared resource cost. The resource cost may be calculated using a Maximal Marginal Reward (MMR) algorithm that is configured to maximize an expected payout or minimize an expected cost.

The one or more shared resources are allocated 140 to the one or more subsystems based on the model. A maintenance schedule for the asset may be determined based on the model. In some cases, the one or more components have a known failure rate and the known failure rates are used to establish the model.

Figure 1B:
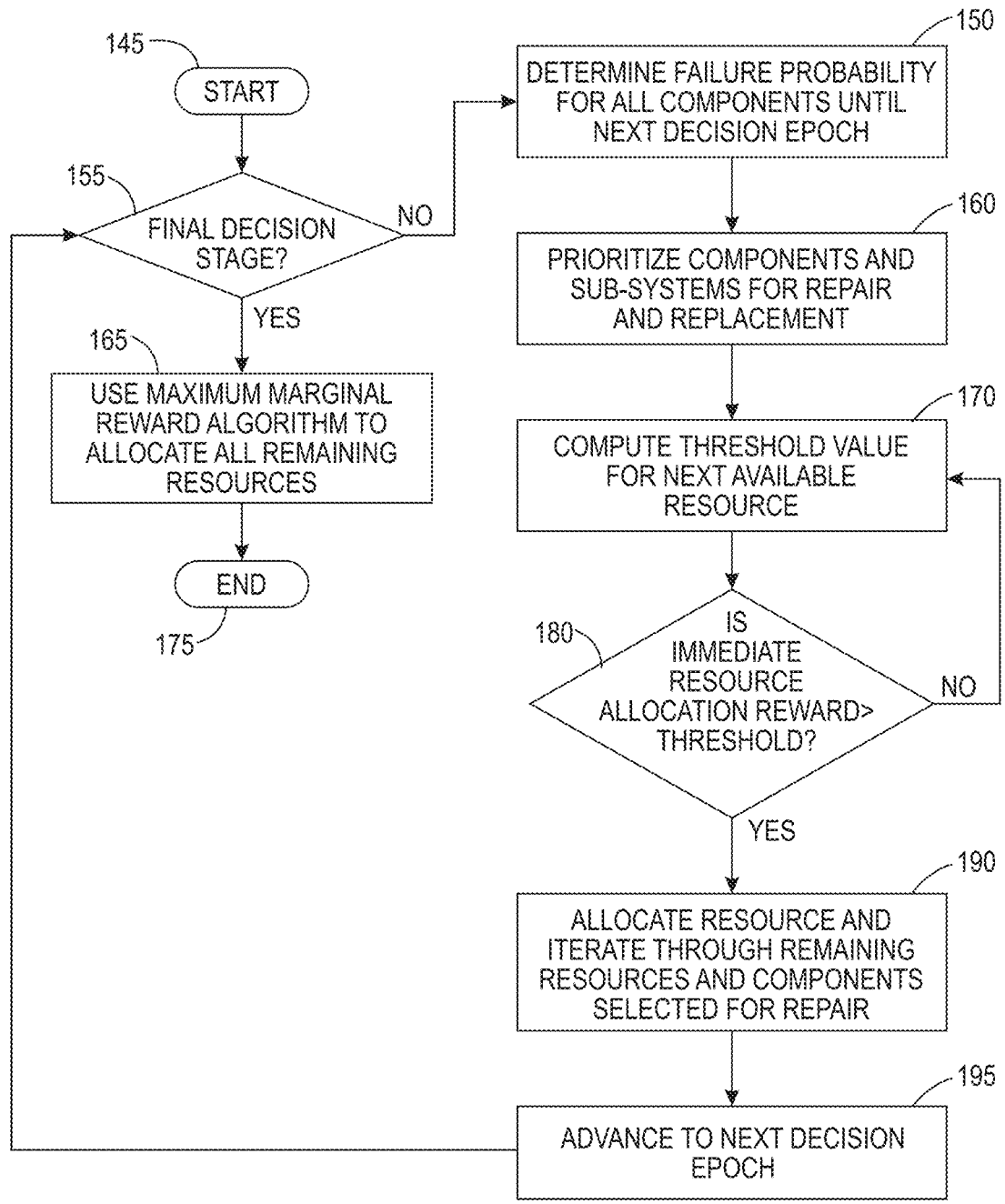
FIG. 1B. illustrates another process for allocating resources using a threshold based heuristic system in accordance with embodiments described herein.

FIG. 1B shows a more detailed flow diagram for allocating resources using a heuristic threshold-based system in accordance with embodiments described herein. The process starts 145 and It is determined 155 whether it is the final decision stage. This may occur when enough information is available about the condition of the asset and the number of available resources to build a model.

If it is not determined 155 that it is the final decision stage, a failure probability for all components of the asset is determined 150 until the next decision epoch. The next decision epoch may be a current task that one or more subsystems of the asset is performing and/or a current mission of the asset, for example.

Components and/or subsystems are prioritized for repair and/or replacement 160. The prioritization may be based on a time to failure of the component and/or subsystem, for example. In some cases, the prioritization may be based on a cost of the replacement and/or repair.

A threshold value is computed 170 for the next available resource. It is determined 180 whether the immediate resource allocation reward is greater than the threshold. If it is determined 180 that the immediate resource allocation reward is not greater than the threshold, the process again computes 170 the threshold value for the next available resource.

If it is determined 180 that the immediate resource allocation reward is greater than the threshold, resources are allocated 190. The remaining resources and components selected for repair are iterated through. The process then advances 195 to the next decision epoch and the process returns to determining 155 if it is the final decision stage and the process continues.

If it is determined 155 has been reached, an algorithm is used 165 to allocate all remaining resources. According to various configurations, the algorithm is the MMR algorithm. The process then ends 175.

Figure 2:
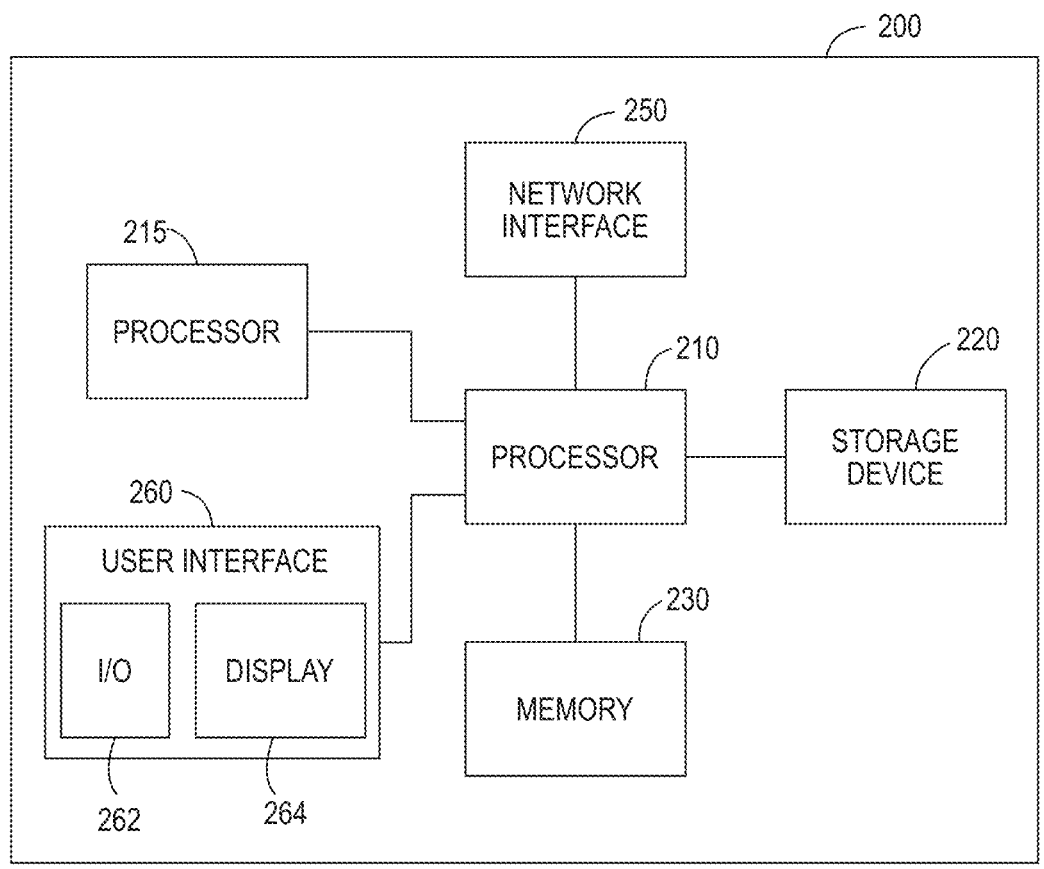
FIG. 2 shows a block diagram of a system capable of implementing embodiments described herein.

The methods described herein can be implemented on a computer using well-known computer processors, memory units, storage devices, computer software, and other components. A high-level block diagram of such a computer is illustrated in FIG. 2. Computer 200 contains a processor 210, which controls the overall operation of the computer 200 by executing computer program instructions which define such operation. It is to be understood that the processor 210 can include any type of device capable of executing instructions. For example, the processor 210 may include one or more of a central processing unit (CPU), a graphical processing unit (GPU), a field-programmable gate array (FPGA), and an application-specific integrated circuit (ASIC). The computer program instructions may be stored in a storage device 220 and loaded into memory 230 when execution of the computer program instructions is desired. Thus, the steps of the methods described herein may be defined by the computer program instructions stored in the memory 230 and controlled by the processor 210 executing the computer program instructions. The computer 200 may include one or more network interfaces 250 for communicating with other devices via a network. The computer 200 also includes a user interface 260 that enable user interaction with the computer 200. The user interface 260 may include I/O devices 262 (e.g., keyboard, mouse, speakers, buttons, etc.) to allow the user to interact with the computer. The user interface may include a display 264. The computer may also include a receiver 215 configured to receive data from the user interface 260 and/or from the storage device 220. According to various embodiments, FIG. 2 is a high-level representation of possible components of a computer for illustrative purposes and the computer may contain other components.

Establishing the model using a threshold based heuristic maintenance policy is described in further detail below.

Markov Task Sets

The decision maker (DM) has at his disposal M homogenous resources that are to be sequentially allocated to incoming tasks. Decisions are made at discrete epochs, i.e., $t=0, 1, \ldots$. Each task i has a window of opportunity, $[t_s^i, t_f^i]$, within which it is active and therefore, the DM can assign resources towards completing the task. A single resource assigned to a task gets the job done at or before the next decision epoch (i.e., task is completed) with probability $p<1$. So, if k resources are allocated to an incomplete task i at decision epoch $t \in [t_s^i, t_f^i)$, the task will be completed with probability $1-(1-p)^k$ at the next decision epoch $t+1$. We assume "complete information" in that the task completion status is known to the DM at the beginning of each decision epoch. Upon successful completion of task i, the DM earns the positive reward $r_i$. The DM also incurs a cost $c>0$ for each resource assigned. Suppose at time 0, the DM knows that N tasks shall arrive with a priori known windows of opportunity. Without loss of generality, we shall assume that at least one of the tasks starts at time 1 i.e., $\min_i t_s^i = 1$. Furthermore, let $T = \max_i t_f^i$ be the time horizon of interest. We wish to compute the optimal allocation of resources to tasks so that the DM accrues the maximal cumulative reward over the time window, $t \in [1, T]$.

Let the task completion status (state) variable: $z(i)=0,1$ indicate that task i is incomplete and complete respectively. At decision epoch t, let $V(z,k,t)$ indicate the optimal cumulative reward (value function) that can be achieved thereafter where k indicates the number of resources left and the vector z encapsulates the status of each task.

A task i is active at the current time if it is incomplete, i.e., $z(i)=0$ and if the current time $t \in [t_s^i, t_f^i]$. Accordingly, we define the set of active tasks, $A(z,t) = \{i: t \in [t_s^i, t_f^i] \text{ and } z(i)=0\}$.

The decision variable, u is a vector wherein $u_i$ indicates the number of resources to be assigned to task i. The feasible allocation set is shown in (1).

$$U(z,k,t)=\{u:\Sigma_{i\in A(z,t)}u_i\leq k, u_i\geq 0, \forall i\in A(z,t), u_i=0, \forall i\notin A(z,t)\}. \quad (1)$$

It follows that the value function $V(z,k,t)$ satisfies the Bellman recursion:

$$V(z, k, t) = \max_{u\in U(z,k,t)} \left\{ \sum_{i\in A(z,t)} [-cu_i + (1-q^{u_i})r_i] + \sum_z Prob(\bar{z})V\left(\bar{z}, k - \sum_{i\in A(z,t)} u_i, t+1\right) \right\}, \quad (2)$$

$$\forall z, k = 1, \ldots, M, \forall t \in [1, T-1],$$

where q=1−p. In effect, we assign $\Sigma_{i\in A(z,t)} u_i$ resources in total. In the next decision epoch, the status of each task changes according to:

$$Prob(\bar{z}(i) = z(i)) = \begin{cases} q^{u_i}, & \forall i \in A(z,t) \\ 1, & \forall i \notin A(z,t) \end{cases} \quad (3)$$

Since the evolution of each task is a completely independent Markov process, the transition probabilities in (3) are given by:

$$Prob(\bar{z})=\pi_{i=1,\ldots,N} Prob(\bar{z}(i)). \quad (4)$$

The boundary conditions for the value function are given by:

$$V(z, k, T) = \max_{u\in U(z,k,T)} \sum_{i\in A(z,T)} [-cu_i + (1-q^{u_i})r_i], \forall z, \quad (5)$$

$$k = 1, \ldots, M,$$

$$V(z, 0, t) = 0, \forall z, t. \quad (6)$$

We shall address the much simpler single task scenario first.

Single Task Allocation

Suppose we are only interested in the optimal allocation of resources to a single active task i. For ease of exposition, let us assume that $1=t_s^i<t_f^i=T_i$. The corresponding task specific value function is given by:

$$V_i(k, t) = \max_{u_i\in[0,k]} \{[-cu_i + (1-q^{u_i})r_i] + q^{u_i} V_i(k - u_i, t+1)\}, \quad (7)$$

$$k = 1, \ldots, M, \forall t \in [1, T_i],$$

with the boundary conditions:

$$V_i(k, T_i) = \max_{u_i\in[0,k]} [-cu_i + (1-q^{u_i})r_i], \quad (8)$$

$$k = 1, \ldots, M,$$

$$V_i(0, t) = 0, \forall t \in [1, T_i]. \quad (9)$$

The optimal policy is given by:

$$\mu_i(k,t)=\arg\max_{u_i\in[0,k]}\{[-cu_i+(1-q^{u_i})r_i]+q^{u_i}V_i(k-u_i,t+1)\}, k=1,\ldots,M,\forall t\in[1,T_i]. \quad (10)$$

Suppose the DM has u+1 resources left at the terminal time $T_i$. We denote the marginal reward yielded by assigning 1 additional resource over and above u resources to the active task i as:

$$\Delta_T^i(u)=-c(u+1)+(1-q^{u+1})r_i-[-cu+(1-q^u)r_i]=-c+pq^u r_i. \quad (11)$$

Since q<1 it follows that $\Delta_T^i(u)$ is monotonic decreasing in u. Let $\kappa_i(T)$ be the least non-negative integer at which the marginal reward becomes negative i.e., $\kappa_i(T_i)=\min_{\ell\geq 0}\ell$ s.t. $pq^\ell r_i<c$. It follows that the optimal policy at the terminal time is given by:

$$\mu_i(k, T_i) = \arg\max_{u_i\in[0,k]}[-cu_i + (1-q^{u_i})r_i] = \begin{cases} k, & k < \kappa_i(T_i) \\ \kappa_i(T_i), & k \geq \kappa_i(T_i) \end{cases} \quad (12)$$

$$\Rightarrow V_i(k, T_i) = -c\mu_i(k, T_i) + [1 - q^{\mu_i(k,T_i)}]r_i, \forall k. \quad (13)$$

In other words, we assign as many resources as is available but no more than the threshold. We will show likewise that at each decision epoch, there is an upper bound to the number of resources that the DM shall assign (optimally) for the remainder of the time horizon. Having computed the terminal value function, we are now in a position to compute the value function at the previous decision epoch. Indeed, we have from (7):

$$V_i(k, T_i - 1) = \max_{u_i\in[0,k]} \{[-cu_i + (1-q^{u_i})r_i] + q^{u_i} V_i(k - u_i, T_i)\}, \quad (14)$$

$$k = 1, \ldots, M.$$

We can show that the value function $V_i(k, T_i−1)$ has a threshold based analytical form similar to $V_i(k, T_i)$. Let the function inside the max operator in (14) be given by, $$W(k, u, T_i) = [-cu + (1-q^u)r_i] + q^{u_i} V_i(k-u, T_i) = \begin{cases} -cu + r_i - q^u \bar{r}_i, & u < k - \kappa_i(T_i) \\ -cu + r_i - q^u c(k-u) - q^k r_i, & u \geq k - \kappa_i(T_i) \end{cases} \quad (15)$$

where, $\bar{r}_i = c\kappa_i(T_i) + q^{\kappa_i(T_i)}r_i$. Note that we substitute for $V_i(k-u, T_i)$ from (13) to get (15). As before, the marginal reward at time $T_i−1$ is defined according to:

$$\Delta_{T-1}^i(k, u) = \quad (16)$$

$$W(k, u+1, T_i) - W(k, u, T_i) = \begin{cases} -c + pq^u r_i, & u < k - \kappa_i(T_i) \\ -c + cq^u f_{T_i-1}(k-u), & u \geq k - \kappa_i(T_i) \end{cases}$$

where, $f_{T-1}(w)=pw+q$. Note however that, unlike $\Delta_T^i(u)$, the marginal reward at time $T_i−1$ is also a function of k, the number of resources left with the DM. The optimal allocation is determined by the threshold value at which the marginal reward becomes negative.

Let $\kappa_i(T_i-1)=\min_{\ell\geq 0}\ell$ s.t. $pq^\ell \bar{r}_i<c$. We have the following results.

Lemma 1 $\kappa_i(T_i-1)\leq\kappa_i(T_i)$.

Proof. If $\kappa_i(T_i)=0$, $\bar{r}_i=r_i$ and it follows from the definition of $\kappa_i(T_i-1)$ that it will also equal 0. Suppose $\kappa_i(T_i)>0$. We have:

$$r_i - \bar{r}_i = -c\kappa_i(T_i) + [1 - q^{\kappa_i(T_i)}]r_i \quad (17)$$
$$= -c\kappa_i(T_i) + p\sum_{\ell=0}^{\kappa_i(T_i)-1} q^\ell r_i,$$
$$= \sum_{\ell=0}^{\kappa_i(T_i)-1} [pq^\ell r_i - c] > 0$$

where (17) follows from the definition of $\kappa_i(T_i)$. In other words, $pq^\ell r_i > c$ for all $\ell \in [0, \kappa_i(T_i))$. It immediately follows from the definition of $\kappa_i(T_i-1)$ that $\kappa_i(T_i-1) \leq \kappa_i(T_i)$.

From the definition of the marginal reward (16), we note that determining when it switches sign depends in part on $f_{T_i-1}(k-u)$. Clearly, $f_{T_i-1}(k-u) = p(k-u) + q$ is a decreasing function of u. Since, $q^0 f_{T_i-1}(k) = pk + q \geq 1$ and $q^{k+1} f_{T_i-1}(0) = q^{k+1} < 1$, $\exists u^*(k) = \min_{u \in [0,k]} u$ s.t. $q^u f_{T_i-1}(k-u) \leq 1$.

Lemma 2

$$u^*(k-1) = \begin{cases} u^*(k), & \text{if } q^{u^*(k)} f_{T_i-1}(k - u^*(k)) < q, \\ u^*(k) - 1, & \text{otherwise.} \end{cases} \quad (18)$$

Proof. By definition we have: $q^{u^*(k)} f_{T_i-1}(k-u^*(k)) \leq 1$ and $q^{u^*(k)-1} f_{T_i-1}(k-u^*(k)+1) > 1$. In addition, we can write:

$$q^{u^*(k)} f_{T_i-1}(k - 1 - u^*(k)) = q^{u^*(k)} f_{T_i-1}(k - u^*(k)) - pq^{u^*(k)} < 1. \quad (19)$$
$$q^{u^*(k)-2} f_{T_i-1}(k - 1 - u^*(k) + 2) = q^{u^*(k)-2} f_{T_i-1}(k - u^*(k) + 1) > 1.$$
$$q^{u^*(k)-1} f_{T_i-1}(k-1, u^*(k)-1) = q^{u^*(k)-1} f_{T_i-1}(k - u^*(k)) \Rightarrow u^*(k-1) =$$
$$\begin{cases} u^*(k) - 1, & \text{if } q^{u^*(k)} f_{T_i-1}(k - u^*(k)) \leq q, \\ u^*(k), & \text{otherwise.} \end{cases}$$

Theorem 1 The optimal allocation policy at $T_i-1$ is dictated by:

$$\mu_i(k, T_i - 1) = \begin{cases} u^*(k), & k \leq \kappa_i(T_i) + \kappa_i(T_i - 1), \\ \kappa_i(T_i - 1), & k > \kappa_i(T_i) + \kappa_i(T_i - 1), \end{cases} \quad (20)$$

where $u^*(\kappa_i(T_i) + \kappa_i(T_i - 1)) = \kappa_i(T_i - 1)$ and for $1 < k \leq \kappa_i(T_i) + \kappa_i(T_i - 1)$, $$u^*(k-1) = \begin{cases} u^*(k) - 1, & \text{if } q^{u^*(k)} f_{T_i-1}(k - u^*(k)) \leq q, \\ u^*(k), & \text{otherwise.} \end{cases} \quad (21)$$

Proof. First, we note that the marginal reward function $\Delta_{T-1}^i(k,u)$ defined earlier (16) is monotonic decreasing in u. Indeed, for $u \in [0, k-\kappa_i(T_i))$, $\Delta_{T-1}^i(k,u) = -c + pq^u \bar{r}_i$ and since $q < 1$ it is decreasing in u. For $u \geq k-\kappa_i(T_i)$, $\Delta_{T-1}^i(k,u) = -c(1 - q^{u+1}) + cpq^u(k-u)$ which is clearly also a decreasing function of u. So, we only need to show that:

$$\Delta_{T-1}^i(k, k-\kappa_i(T_i)-1) > \Delta_{T-1}^i(k, k-\kappa_i(T_i))).$$

From the definition of $\kappa_i(T_i)$, we have: $pq^{\kappa_i(T_i)-1} r_i > c$. So, we can write:

$$\Delta_{T-1}^i(k, k - \kappa_i(T_i)) = -c + q^{k-\kappa_i(T_i)} c[p\kappa_i(T_i) + q] \quad (22)$$
$$< -c + q^{k-\kappa_i(T_i)-1} cp\kappa_i(T_i) + q^{k-\kappa_i(T_i)} c$$
$$< -c + q^{k-\kappa_i(T_i)-1} cp\kappa_i(T_i) + q^{k-\kappa_i(T_i)} [pq^{\kappa_i(T_i)-1} r]$$
$$= -c + pq^{k-\kappa_i(T_i)-1} \bar{r}_i$$
$$= \Delta_{T-1}^i(k, k - \kappa_i(T_i) - 1).$$

As before, It follows that the optimal allocation u* is the threshold value at which the marginal reward becomes negative. However, the added complexity here is the dependence on k. So, we deal with the three possible scenarios that lead to different threshold values:

$k > \kappa_i(T_i) + \kappa_i(T_i-1)$: For this case, $\kappa_i(T_i-1) < k - \kappa_i(T_i)$. We have already shown that $\Delta_{T-1}^i(k,u)$ decreases for $u \in [0, k-\kappa_i(T_i))$ and so, the threshold occurs at $u^* = \kappa_i(T_i-1)$. Indeed, this follows from the definition of $\kappa_i(T_i-1)$.

$k = \kappa_i(T_i) + \kappa_i(T_i-1)$: For this case, $k - \kappa_i(T_i) = \kappa_i(T_i-1)$. As such, $\Delta_{T-1}^i(k,u) > 0$ for $u \in [0, k-\kappa_i(T_i))$. From the definition of $\kappa_i(T_i)$, we have: $pq^{\kappa_i(T_i)-1} r_i > c \Rightarrow pq^{\kappa_i(T_i)} r_i > cq$. The marginal reward at $\kappa_i(T_i-1)$ is given by:

$$\Delta_{T-1}^i(k, \kappa_i(T_i - 1)) = c[p\kappa_i(T_i) + q]q^{\kappa_i(T_i-1)} - c \quad (23)$$
$$= [pc\kappa_i(T_i) + cq]q^{\kappa_i(T_i-1)} - c$$
$$< [c\kappa_i(T_i) + q^{\kappa_i(T_i)} r_i] pq^{\kappa_i(T_i-1)} - c$$
$$= pq^{\kappa_i(T_i-1)} \bar{r}_i - c \leq 0,$$

where the last inequality follows from the definition of $\kappa_i(T_i-1)$. So, it follows that the threshold value at which the marginal reward turns negative is given by $u^* = \kappa_i(T_i-1)$.

$k < \kappa_i(T_i) + \kappa_i(T_i-1)$: For this case, $k - \kappa_i(T_i) < \kappa_i(T_i-1)$. As such, $\Delta_{T-1}^i(k,u) > 0$ for $u \in [0, k-\kappa_i(T_i))$. So, the threshold must occur at some $u \in [k-\kappa_i(T_i), k]$ at which $q^u f_{T_i-1}(k-u)$ dips below unity. From Lemma 2 it follows that: for $$k \leq \kappa_i(T_i) + \kappa_i(T_i - 1), \quad (24)$$
$$u^*(k-1) = \begin{cases} u^*(k) - 1, & \text{if } q^{u^*(k)} f_{T_i-1}(k - u^*(k)) \leq q, \\ u^*(k), & \text{otherwise.} \end{cases}$$

with the boundary condition $u^*(\kappa_i(T_i) + \kappa_i(T_i-1)) = \kappa_i(T_i-1)$, which was established in 2).

In summary, we have:

$$\mu_i(k, T_i - 1) = \begin{cases} \kappa_i(T_i - 1), & k \geq \kappa_i(T_i) + \kappa_i(T_i - 1), \\ u^*(k), & k < \kappa_i(T_i) + \kappa_i(T_i - 1), \end{cases} \quad (25)$$

where $u^*(k)$ is computed via the backward recursion (24).

It follows from (15) that the optimal value function at time $T_i-1$ is given by:

$$V_i(k, T_i - 1) = \quad (26)$$
$$\begin{cases} -c\kappa_i(T_i - 1) + r_i - q^{\kappa_i(T_i-1)} \bar{r}_i, & k \geq \kappa_i(T_i) + \kappa_i(T_i - 1), \\ -cu^*(k) + [1 - q^k] r_i - q^{u^*(k)} c(k - u^*(k)), & \text{otherwise.} \end{cases}$$

Corollary 1 The optimal allocation at time $T_i-1$ is such that the number of resources left at the last stage $T_i$ is no more than the optimal threshold $\kappa_i(T_i)$. In other words, $$k - \mu_i(k, T_i-1) \leq \kappa_i(T_i), \; k < \kappa_i(T_i) + \kappa_i(T_i-1). \quad (27)$$

Proof. This follows from (24). As k decreases by a value of 1, $u^*(k)$ either remains the same or goes down by 1. So, it cannot decrease fast enough that $k - u^*(k)$ exceeds the threshold $\kappa_i(T_i)$. In other words, when the total number of resources is less than the sum of thresholds $\kappa_i(T_i)+\kappa_i(T_i-1)$, no resources will be left unused at the final time $T_i$.

Threshold Based Optimal Policy and Recursion

In light of Theorem 1, one can easily compute the optimal thresholds i.e., number of resources to be allocated at each decision epoch when resources are aplenty. In particular, we have the result: for any $t \in [1, T_i]$, $$\mu_i(k, t) = \kappa_i(t), k \geq \sum_{\ell=0}^{T_i-t} \kappa_i(T_i - \ell), \quad (28)$$

where the thresholds can be computed via a backward recursion. For any $t=T_i, \ldots, 1$:

$$\kappa_i(t) = \min_{\ell \geq 0} \ell \text{ s.t. } pq^\ell R_{T_i-t} \leq c, \quad (29)$$

$$R_{T_i-t+1} = c\kappa_i(t) + q^{\kappa_i(t)} R_{T_i-t},$$

with the boundary condition, $R_0=r_i$. The optimal value function is given by:

$$V_i(k, t) = -c\kappa_i(t) + r_i - q^{\kappa_i(t)} R_{T_i-t}, k \geq \sum_{\ell=0}^{T_i-t} \kappa_i(T_i - \ell). \quad (30)$$

In other words, one can quickly compute the thresholds $\kappa_i(t)$ over the entire time window without resorting to the non-linear Bellman recursion. At decision time t, the DM allocates exactly the threshold amount so long as the number of available resources is no less than the sum of thresholds over the remainder of the time horizon.

Remarks

This also tells us that for any task i, the DM requires at most a maximum of $$\sum_{\ell=0}^{T_i-1} \kappa_i(T_i - \ell)$$

resources. Furthermore, since the rewards $R_\ell$ are strictly decreasing with $\ell$ (see (17) in Lemma 1), it follows that $\kappa_i(T_i-\ell)$ must go to zero as $\ell$ increases. Indeed, there exists $n(i) \in [0, \infty)$ such that $\kappa_i(T(i)-n(i))=0$. So, the DM need never allocate more than $$\sum_{\ell=0}^{n(i)-1} \kappa_i(T_i - \ell)$$

resources to task i and furthermore, the window of opportunity for target i needs to be no longer than n(i). If the window is any longer, it is optimal for the DM to simply hold off without assigning any resources until the remaining time window shrinks to n(i).

Numerical Example

Figure 3:
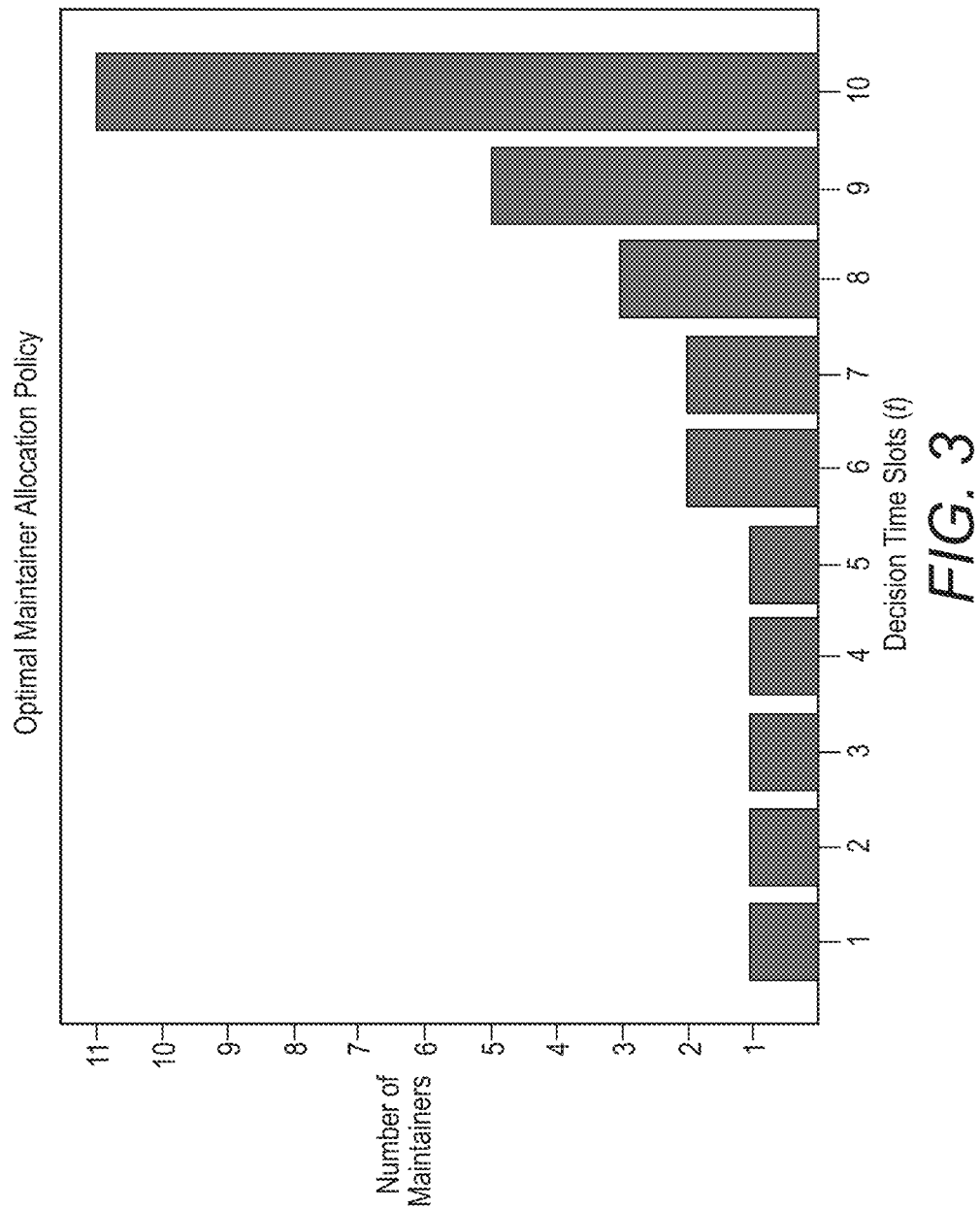
FIG. 3 shows a more an optimal maintenance resource allocation policy of threshold versus time slots in accordance with embodiments described herein.
Figure 4:
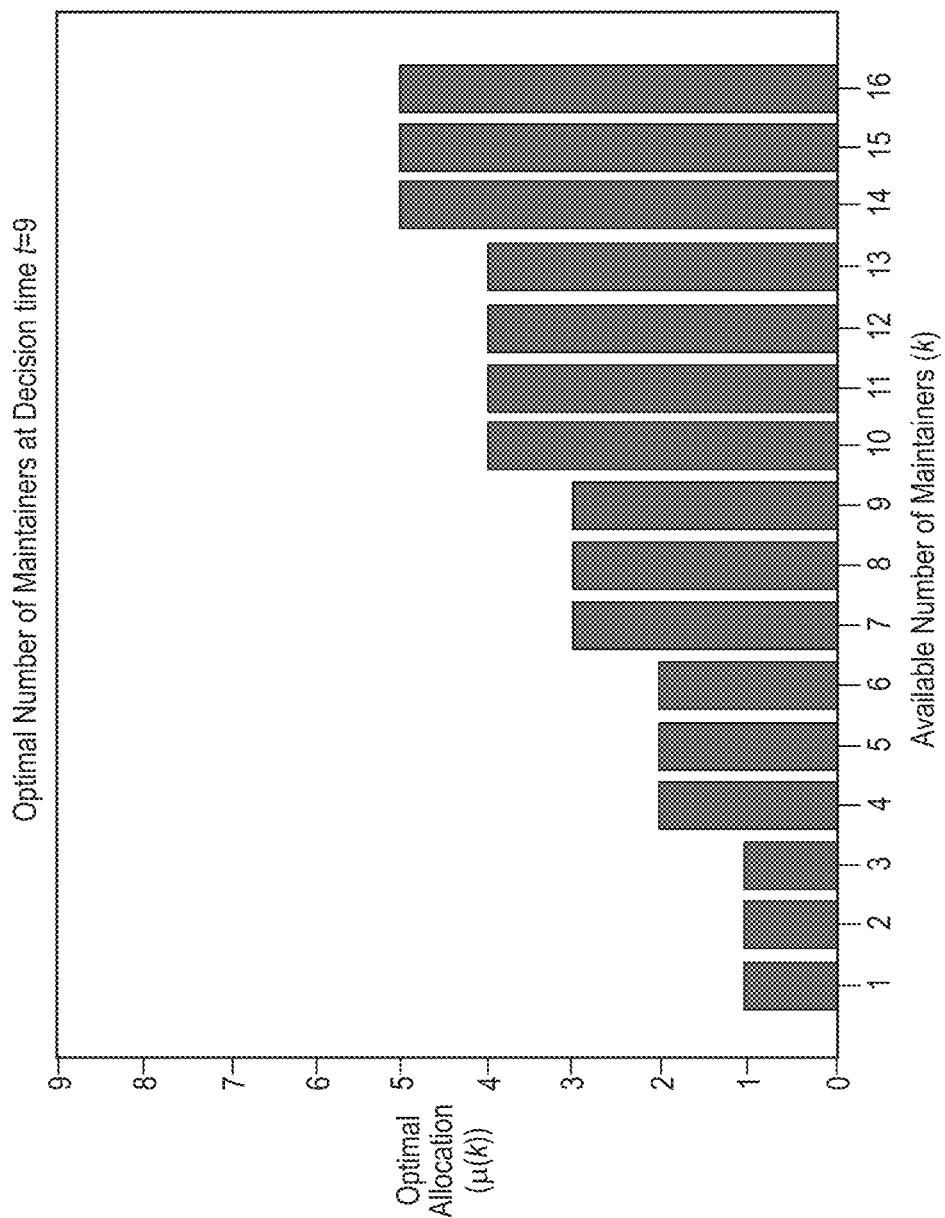
FIG. 4 illustrates a maintenance resource allocation policy of optimal allocation versus number of maintenance resources in accordance with embodiments described herein.

We use as an example the allocation of maintenance personnel to a piece of industrial equipment prone to failure to illustrate our method and results. The example problem involves the allocation of maintenance personnel to a single piece of equipment over a window of opportunity, T=10. The reward, r=90, the probability of resolving the fault, p=0.25 and the cost of allocating a maintainer, c=1. According to various configurations, since the cost of allocating one maintainer is c=1, minimizing this cost is equivalent to minimizing the number of maintainers. Using the backward recursion (29), we compute the threshold values, $\kappa(j)$, j=1, ..., 10 as shown in FIG. 3. In particular, $\kappa(10)=11$ and $\kappa(9)=5$. So, we compute the optimal allocation at time t=9 for all possible $k<\kappa(10)+\kappa(9)$ as shown in FIG. 4. As per Lemma 2, the optimal allocation starts at $\kappa(9)$ and either remains the same or decreases by one with decreasing k.

Single Task Optimal Allocation at All Stages

In the previous section, we have completely characterized the optimal allocation at stages $T_i$ and $T_i-1$. Note that the optimal allocation at stage $T_i$ is linear up to the threshold $\kappa_i(T_i)$ and a constant thereafter. The optimal allocation at stage $T_i-1$ is far more interesting in that it is piecewise constant and monotonic non-decreasing up to the threshold $\kappa_i(T_i-1)$. Arguably, the optimal allocation at earlier stages will also exhibit a piecewise constant and monotonic non-decreasing behavior. The difficulty is in computing the switching points where the allocation increases by 1. When resources are abundant, we have the complete solution. The interesting case is when resources are scarce where it is not obvious how to distribute them among the different stages knowing that future stages may not come into play. Nonetheless, one can still generalize some of the results that have been shown to be true for stage $T_i-1$. Indeed, the optimal value function for earlier stages generalizes (26) and has the form: for $\ell > 0$ and $k \leq$ $$\sum_{h=0}^{\ell} \kappa_i(T_i - h), \quad (31)$$

$$V_i(k, T_i - \ell) = -c\mu(k, T_i - \ell) + \left[1 - q^{\mu(k,T_i-\ell)}\right]r_i +$$

$$q^{\mu(k,T_i-\ell)}\left\{-c\mu(\tilde{k}_1, T_i-\ell+1) + \left[1 - q^{\mu(\tilde{k}_1,T_i-\ell+1)}\right]r_i + q^{\mu(\tilde{k}_1,T_i-\ell+1)}[\ldots]\right\} =$$

$$-c\mu(k, T_i-\ell) + \left[1-q^k\right]r_i - c\sum_{j=1}^{\ell} q^{\sum_{n=0}^{j-1}\mu(\tilde{k}_n,T_i-\ell+n)}\mu(\tilde{k}_j, T_i-\ell+j),$$

$$\tilde{k}_j = \tilde{k}_{j-1} - \mu(\tilde{k}_{j-1}, T_i-\ell+j-1), j=1, \ldots, \ell, \text{ and } \tilde{k}_0 = k.$$

The above value function reflects the fact that the DM incurs a cost of $c \times \mu(\tilde{k}_j, T_i-\ell+j)$ only if the resources allocated at all previous stages $T_i-\ell+n, n \in [0, j-1]$ are unsuccessful in completing the task. Moreover, the optimal allocation at stage $T_i-\ell+j$ is a function of the number of resources left at the stage, $\tilde{k}_{T_i-\ell+j}$, which, by definition, is the number of resources allocated at previous stages deducted from the initial inventory of k resources. Since all k resources are allocated, the expected reward equals $[1-q^k]r_i$. The exact distribution of the k resources amongst the different stages requires solving the Bellman recursion. For the special case of $k= \sum_{h=0}^{\ell} \kappa_i(T_i-h)$, the result is immediate and the optimal allocation, $\mu(\tilde{k}_j, T_i-\ell+j)=\kappa_i(T_i-\ell+j), j \in [0, \ell]$.

From (31), we can also generalize the marginal reward function. Suppose u resources are allocated at stage $T_i-\ell$ and optimal allocations are made thereafter. We can write:

$$W_i(k, u, T_i - \ell) = -cu + [1 - q^k]r_i - \qquad (32)$$

$$cq^u \left[ \mu(\tilde{k}_1, T_i - \ell + 1) + \sum_{j=2}^{\ell} q^{\sum_{n=1}^{j-1} \mu(\tilde{k}_n, T_i - \ell + n)} \mu(\tilde{k}_j, T_i - \ell + j) \right],$$

$$\tilde{k}_j = \tilde{k}_{j-1} - \mu(\tilde{k}_{j-1}, T_i - \ell + j - 1), j = 2, \ldots, \ell, \text{ and } \tilde{k}_1 = k - u.$$

It follows that the marginal reward at stage $T_i - \ell$ is given by:

$$\Delta^i_{T_i - \ell}(k, u) = W_i(k, u + 1, T_i - \ell) - W_i(k, u, T_i - \ell) \qquad (33)$$

$$= -c + cq^u \{ \mu(k - u, T_i - \ell + 1) - q\mu(k - u - 1, T_i - \ell + 1)$$

$$+ \sum_{j=2}^{\ell} q^{\sum_{n=1}^{j-1} \mu(\tilde{k}_n, T_i - \ell + n)} \mu(\tilde{k}_j, T_i - \ell + j)$$

$$- q \sum_{j=2}^{\ell} q^{\sum_{n=1}^{j-1} \mu(\overline{k}_n, T_i - \ell + n)} \mu(\overline{k}_j, T_i - \ell + j) \},$$

$$\overline{k}_j = \overline{k}_{j-1} - \mu(\overline{k}_{j-1}, T_i - \ell + j - 1), j = 2, \ldots, \ell, \text{ and } \overline{k}_1 = k - u - 1. \quad (34)$$

Let $\Delta^i_{T_i - \ell}(k, u) = -c + cq^u f_{T_i - \ell}(k - u)$, where $f_{T_i - \ell}(k - u)$ represents the quantity inside the curly brackets in (33). Assuming that the unit incremental property of the optimal allocation (see Lemma 2) holds for all stages, we have either $\mu(\tilde{k}_1, T_i - \ell + 1) = \mu(\tilde{k}_1 - 1, T_i - \ell + 1)$ or $\mu(\tilde{k}_1, T_i - \ell + 1) = \mu(\tilde{k}_1 - 1, T_i - \ell + 1) + 1$. Accordingly, 1) if $\mu(\tilde{k}_1, T_i - \ell + 1) = \mu(\tilde{k}_1 - 1, T_i - \ell + 1)$, we have:

$$f_{T_i - \ell}(k - u) = p\mu(\tilde{k}_1, T_i - \ell + 1) \qquad (35)$$

$$+ q^{\mu(\tilde{k}_1, T_i - \ell + 1)} \left[ \sum_{j=2}^{\ell} q^{\sum_{n=2}^{j-1} \mu(\tilde{k}_n, T_i - \ell + n)} \mu(\tilde{k}_j, T_i - \ell + j) \right.$$

$$\left. - q \sum_{j=2}^{\ell} q^{\sum_{n=2}^{j-1} \mu(\overline{k}_n, T_i - \ell + n)} \mu(\overline{k}_j, T_i - \ell + j) \right]$$

$$= p\mu(\tilde{k}_1, T_i - \ell + 1) + q^{\mu(\tilde{k}_1, T_i - \ell + 1)} f_{T_i - \ell + 1}(\tilde{k}_1 - \mu(\tilde{k}_1, T_i - \ell + 1)), \qquad (36)$$

where we recognize that the expression inside the square brackets in (35) is, by definition, $f_{T_i - \ell + 1}(\tilde{k}_1 - \mu(\tilde{k}_1, T_i - \ell + 1))$.
if $\mu(\tilde{k}_1, T_i - \ell + 1) = \mu(\tilde{k}_1 - 1, T_i - \ell + 1) + 1$, we have: $\overline{k}_1 = \tilde{k}_1 - 1$ and $\overline{k}_j = \tilde{k}_j, \forall j \geq 2$. It follows that, $$f_{T_i - \ell}(k - u) = p\mu(\tilde{k}_1, T_i - \ell + 1) + q. \qquad (37)$$

In addition to the unit incremental property, further suppose (as in Lemma 2)), that:

$$\mu(\tilde{k}_1 - 1, T_i - \ell + 1) = \mu(\tilde{k}_1, T_i - \ell + 1) - 2) \text{ if } q^{\mu(\tilde{k}_1, T_i - \ell + 1)}$$

$$f_{T_i - \ell + 1}(\tilde{k}_1, \mu(\tilde{k}_1, T_i - \ell + 1)) \leq q. \qquad (38)$$

Combining (36), (37) and (38), we have:

$$f_{T_i - \ell}(w) = p\mu(w, T_i - \ell + 1) + \max\{q \ q^{\mu(w, T_i - \ell + 1)};$$

$$f_{T_i - \ell + 1}(w - \mu(w, T_i - \ell + 1))\}. \qquad (39)$$

Recall that the optimal allocation at the last stage, $\mu(k, T_i) = k$, $k \leq \kappa_i(T_i)$. So, we have the initial condition for the update given by:

$$f_{T_i - 1}(w) = p\mu(w, T_i) + q = pw + q, \qquad (40)$$

which matches with our earlier definition for $f_{T_i - 1}(w)$. Finally, we can extend the optimal allocation result to all stages by generalizing Theorem 1.

Theorem 2 The optimal allocation policy at $T_i - \ell$ for any $\ell > 0$ is dictated by:

$$\mu_i(k, T_i - \ell) = \begin{cases} u^*(k), & k \leq \sum_{h=0}^{\ell} \kappa_i(T_i - h), \\ \kappa_i(T_i - \ell), & k > \sum_{h=0}^{\ell} \kappa_i(T_i - h), \end{cases} \qquad (41)$$

where $u^* \left( \sum_{h=0}^{\ell} \kappa_i(T_i - h) \right) = \kappa_i(T_i - \ell)$ and for $1 < k \leq \sum_{h=0}^{\ell} \kappa_i(T_i - h)$, $$u^*(k - 1) = \begin{cases} u^*(k) - 1, & \text{if } q^{u^*(k)} f_{T_i - \ell}(k - u^*(k)) \leq q, \\ u^*(k), & \text{otherwise.} \end{cases} \qquad (42)$$

The update function for $f_{T_i - \ell}(.)$ is given by (39) with the initial condition (40).

To prove the above result, we have to generalize the results shown for $f_{T_i - 1}(.)$ to the general case of $f_{T_i - \ell}(.)$ for any $\ell > 1$. Recall the optimal policy at the terminal time is given by:

$$\mu_i(k, T_i) = \begin{cases} k, & k < \kappa_i(T_i), \\ \kappa_i(T_i), & k \geq \kappa_i(T_i). \end{cases} \qquad (43)$$

Multiple Temporally Disjoint Tasks

We return our attention to the multiple task arrivals. The ensuing analysis is greatly simplified when the arriving tasks are temporally disjoint. In other words, suppose the time windows $[t_s^i, t_f^i]$ for different tasks are completely disjoint. Without loss of generality, we can assume that the N tasks are ordered temporally as follows: $1 = t_s^1 < t_f^1 < t_s^2 < t_f^2 < \ldots < t_s^N < t_f^N = T$. Furthermore, we can also assume that $t_s^{i+1} = t_f^i + 1$ for all $i < N$ since the DM cannot allocate anything between two successive disjoint windows of opportunity.

Concurrent Tasks

This case deals with the scenario wherein there are two or more tasks such that the intersection of their windows of opportunity is non empty. The curse of dimensionality may render the dynamic programming recursion intractable. However, we can use the notion of marginal reward from the single task case to establish heuristic policies. The idea would be to assign resources greedily to tasks that yield the maximal marginal reward.

Random Task Arrivals

This would be the most complex scenario, wherein the windows of opportunity are no longer fixed. In other words, suppose the length of each task window $T_i$ is known, but the start time is random. The original recursion has to be modified to account for random arrivals. For example, we could assume that each time step task of type i would appear with probability $\alpha_i$. Furthermore, we could assume that once a task arrives, no other task can arrive until either the current task is completed or its window of opportunity expires.

The allocation of resources is described in more detail in the following paragraphs. According to various implementations, an asset performs a sequence of identical missions at time, t=1, 2, . . . , T and is brought into service in between missions. The asset is comprised of m independent sub-systems connected in series with each sub-system i comprising $n_i$ independent, identical constant failure rate (CFR) components connected in parallel. At any point in time, a component is either functioning or has failed. A sub-system is also either functioning (if at least one of its components is functioning) or has failed. The asset is functioning and can perform a mission successfully only if all of its sub-systems are functioning. A faulty component can be repaired during the break between two consecutive missions. We assume that each component in sub-system i has reliability $r_i$ i.e., a functioning component at the start of a mission fails during the mission with probability $q_i=1-r_i$. In this example, each component requires exactly 1 man hour to be repaired. The decision maker (DM) has at his disposal a total budget of M man hours over the entire planning horizon. There is a unit cost c>0 borne by the DM for each man hour expended. We assume "complete information" in that each component's status is known to the DM at the end of a mission (or beginning of a break). We wish to maximize the asset reliability while minimizing cumulative service cost over the remainder of the planning horizon. At the end of mission t, suppose $s_i \leq n_i$ components are found to be faulty in sub-system i and the DM allocates $u_i \leq s_i$ man-hours for repairing subsystem i. The reliability of subsystem i for mission t+1 is given by: $1-q_i^{n_i-s_i+u_i}$. In other words, this is the probability that not all functioning components in subsystem i fail during the $(t+1)^{th}$ mission. Correspondingly, the reliability of the asset for mission t+1 is given by:

$$\Pi_{i=1}^{m}\left[1 - q_i^{n_i-s_i+u_i}\right].$$

Single Mission Allocation

Suppose we have a budget of k man-hours and a single mission for which we wish to maximize asset reliability and minimize resource use (cost). As before, let $s_i \leq n_i$ denote the number of faulty components before the start of the mission. Let us allocate $u_i \leq s_i$ man hours towards repairing components in sub-system i. The optimization problem becomes:

$$\max_u \left\{ \prod_{i=1}^{m}\left[1 - q_i^{n_i-s_i+u_i}\right] - c\sum_{i=1}^{m} u_i \right\} \quad (44)$$

subject to $$\sum_{i=1}^{m} u_i \leq k.$$

For this single stage optimization problem, it can be shown that the optimal allocation is given by the Maximal Marginal Reward (MMR) algorithm. Indeed, we assign one man-hour at a time to the sub-system that yields the highest marginal reward for the additional allocation. Suppose we have already assigned $u_i$ man-hours to sub-system i. The marginal reward i.e., increase in asset reliability yielded by assigning an additional man hour to sub-system i minus the additional cost is given by:

$$\Delta_i(u) = r_i q_i^{n_i-s_i+u_i} \Pi_{j=1;j\neq i}^{m}\left[1 - q_j^{n_j-s_j+u_j}\right] - c. \quad (45)$$

We assign the next available man hour to the sub-system with the highest payoff: $\arg\max_i[\Delta_i(u)]$. We stop assigning resources when this quantity becomes negative indicating that any additional allocation yields a negative (marginal) reward.

Multi-Mission Allocation

Suppose at decision time t, the DM is left with k man-hours and the number of faulty components in sub-system i is given by $s_i$ and the state vector, $s=(s_1, \ldots, s_m)$. Let the DM allocate $u_i \leq s_i$ man-hours towards repairing components in sub-system i. The corresponding expected future payoff or value function is given by:

$$V(k, s, t) = \max_{u_i : \sum_{i=1}^{m} u_i \leq k} \quad (46)$$
$$\left\{ \prod_{i=1}^{m}\left[1 - q_i^{n_i-s_i+u_i}\right] - c\sum_{i=1}^{m} u_i + \sum_{\bar{s}} \text{Prob}(\bar{s}) V\left(k - \sum_{i=1}^{m} u_i, \bar{s}, t+1\right) \right\},$$
$$s_i = 1, \ldots, n_i, \forall i,$$

where the number of failed components in sub-system i at the end of mission t+1 is given by $\bar{s}_i=s_i-u_i+z_i$. Note that $z_i$ is a binomial random variable with $n_i-s_i+u_i$ individual and identical Bernoulli trials having probability of success $q_i$, i.e., $z_i \sim B(n_i-s_i+u_i, q_i)$. Suppose we wish to assign an additional resource (man-hour) to sub-system i. As before, the immediate marginal reward yielded by this allocation is given by:

$$\Delta_i(u) = r_i q_i^{n_i-s_i+u_i} \Pi_{j=1;j\neq i}^{m}\left[1 - q_j^{n_j-s_j+u_j}\right] - c. \quad (47)$$

On the other hand, if the additional resource is kept in reserve for future stages (breaks), the expected marginal future reward is given by:

$$W\left(k - \sum_{i=1}^{m} u_i, t+1\right) - W\left(k - \sum_{i=1}^{m} u_i - 1, t+1\right), \quad (48)$$

where:

$$W(\bar{k},t+1) = \Sigma_{\bar{s}} \text{Prob}(\bar{s}) V(\bar{k},\bar{s},t+1). \quad (49)$$

Single Sub-System Multi-Mission Allocation

Suppose we are only interested in the optimal allocation of resources to a single sub-system i. Recall decisions are made at t=1, . . . , T before the start of the $t^{th}$ mission. We assume that all components are healthy before the start of the $1^{st}$ mission. Suppose at decision time t, the DM is left with k man-hours and the number of faulty components is given by s. We wish to minimize the cost of labor and maximize the number of successful missions. The unit cost c>0 can be appropriately chosen to trade off the cost of labor with mission success probability. The corresponding sub-system specific value function is given by:

$$V_i(k, s, t) = \max_{u \in [0, min(k,s)]} \left\{ R_i(s, u) + \sum_{\bar{s}=s-u}^{n_i} \text{Prob}(\bar{s}) V_i(k-u, \bar{s}, t+1) \right\}, \quad (50)$$

$$k = 1, \ldots, M, s = 1, \ldots, n_i, \forall t \in [1, T-1],$$

where where the immediate reward associated with allocation u is given by $R_i(s,u) = 1 - q_i^{n_i-s+u} - cu$ and the number of failed components at the end of mission t+1 is given by $\bar{s} = s - u + z_i$. Note that $z_i$ is a binomial random variable with $n_i - s + u$ individual and identical Bernoulli trials having probability of success $q_i$, i.e., $z_i \sim B(n_i - s + u, q_i)$. Let the binomial mass distribution function be denoted by $$b(y, \ell, q_i) = \binom{y}{\ell} q_i^\ell r_i^{y-\ell}.$$

So, the Bellman recursion becomes:

$$V_i(k, s, t) = \quad (51)$$
$$\max_{u \in [0, min(k,s)]} \left\{ R_i(s, u) + \sum_{\ell=0}^{n_i-s+u} b(n_i - s + u, \ell, q_i) V_i(k-u, s-u+\ell, t+1) \right\},$$

$$k = 1, \ldots, M, s = 1, \ldots, n_i, \forall t \in [1, T-1].$$

The optimal policy is given by:

$$\mu_i(k, s, t) = \arg\max_{u \in [0, min(k,s)]} \quad (52)$$
$$\left\{ R_i(s, u) + \sum_{\ell=0}^{n_i-s+u} b(n_i - s + u, \ell, q_i) V_i(k-u, s-u+\ell, t+1) \right\},$$

$$k = 1, \ldots, M, s = 1, \ldots, n_i, \forall t \in [1, T-1].$$

At the terminal decision epoch, we have the boundary condition:

$$V_i(k, s, T) = \max_{u \in [0, min(k,s)]} R_i(s, u), k = 1, \ldots, M, s = 1, \ldots, n_i. \quad (53)$$

When there are no man hours left, the system evolves autonomously and we have:

$$V_i(0, s, t) = 1 - q_i^{n_i-s} + \sum_{\ell=0}^{n_i-s} b(n_i - s, \ell, q_i) V_i(0, s+\ell, t+1), \quad (54)$$

$$s = 1, \ldots, n_i, t \in [1, T-1].$$

Lemma 1

$$V_i(0, s, T-h+1) = h - \sum_{j=1}^{h} \left(1 - r_i^j\right)^{n_i-s}, s = 1, \ldots, n_i, \forall h \in [1, T]. \quad (55)$$

Proof. From the boundary condition (53), we have:

$$V_i(0, s, T) = 1 - q_i^{n_i-s}, s = 1, \ldots, n_i. \quad (56)$$

We make the induction assumption that:

$$V_i(0, s, T-h+1) = h - \sum_{j=1}^{h} \left(1 - r_i^j\right)^{n_i-s}, s = 1, \ldots, n_i. \quad (57)$$

for some h > 1. It follows that:

$$V_i(0, s, T-h) = 1 - q_i^{n_i-s} + \sum_{\ell=0}^{n_i-s} b(n_i - s, \ell, q_i) V_i(0, s+\ell, T-h+1)$$

$$= 1 - q_i^{n_i-s} + \sum_{\ell=0}^{n_i-s} \binom{n_i - s}{\ell} q_i^\ell r_i^{n_i-s-\ell} \left[ h - \sum_{j=1}^{h} \left(1 - r_i^j\right)^{n_i-s-\ell} \right] \quad (58)$$

$$= h + 1 - q_i^{n_i-s} - q_i^{n_i-s} \sum_{\ell=0}^{n_i-s} \binom{n_i - s}{\ell} r_i^{n_i-s-\ell} \sum_{j=1}^{h} \left( \frac{1 - r_i^j}{q_i} \right)^{n_i-s-\ell}$$

$$= h + 1 - q_i^{n_i-s} - q_i^{n_i-s} \sum_{\ell=0}^{n_i-s} \binom{n_i - s}{\ell} r_i^{n_i-s-\ell} \sum_{j=1}^{h} \left( \sum_{a=0}^{j-1} r_i^a \right)^{n_i-s-\ell}$$

$$= h + 1 - q_i^{n_i-s} \left[ 1 + \sum_{j=1}^{h} \sum_{\ell=0}^{n_i-s} \binom{n_i - s}{\ell} \left( \sum_{a=1}^{j} r_i^a \right)^{n_i-s-\ell} \right] \quad (59)$$

$$= h + 1 - q_i^{n_i-s} \left[ 1 + \sum_{j=1}^{h} \left( 1 + \sum_{a=1}^{j} r_i^a \right)^{n_i-s} \right]$$

$$= h + 1 - q_i^{n_i-s} \left[ 1 + \sum_{j=1}^{h} \left( \sum_{a=0}^{j} r_i^a \right)^{n_i-s} \right]$$

$$= h + 1 - \sum_{j=1}^{h+1} \left(1 - r_i^j\right)^{n_i-s}. \quad (60)$$

We have used the induction assumption in (58) and repeatedly used $$q_i = 1 - r_i \text{ and } 1 - r_i^b = q_i \sum_{j=0}^{b-1} r_i^j$$

to arrive at (60).

At the terminal decision epoch T, if there are s faulty components, we will at most need only s man hours to repair them. So, the optimal allocation for k>s is the same as the optimal allocation for k=s. With this in mind, recall the boundary condition:

$$V_i(k, s, T) = \max_{u \in [0, \min(k,s)]} R_i(s, u), s = 1, \ldots, n_i. \quad (61)$$

Suppose the DM has u+1 resources left at the terminal time T. We denote the marginal reward yielded by assigning 1 additional resource over and above u resources to the active task i as:

$$\Delta_T{}^i(u) = R_i(s, u+1) - R_i(s, u) = -c + q_i^{n_i - s + u} r_i. \quad (62)$$

Since $q_i < 1$ it follows that $\Delta_T{}^i(u)$ is monotonic decreasing in u. Let $\kappa_i(T)$ be the least non-negative integer at which the marginal reward becomes negative i.e., $\kappa_i(T) = \min_{\ell \geq 0} \ell$ s.t. $q_i^\ell r_i < c$. It follows that the optimal policy at the terminal decision epoch is given by: for $k \leq s$, $$\mu_i(k, s, T) = \arg\max_{u \in [0, k]} R_i(s, u) = \begin{cases} 0, & n_i - s \geq \kappa_i(T), \\ k, & n_i - s + k \leq \kappa_i(T), \\ \kappa_i(T) - n_i + s, & \text{otherwise.} \end{cases} \quad (63)$$

For k>s, the optimal assignment is given by:

$$\mu_i(k, s, T) = \mu_i(s, s, T) = \begin{cases} 0, & n_i - s \geq \kappa_i(T), \\ s, & n_i \leq \kappa_i(T), \\ \kappa_i(T) - n_i + s, & \text{otherwise.} \end{cases} \quad (64)$$

In other words, we assign as many resources as possible so that $n_i - s + u$ gets close to the threshold $\kappa_i(T)$ without exceeding it. The optimal terminal value is given by:

$$V_i(k, s, T) = R_i(s, \mu_i(k, s, T)) = 1 - q_i^{n_i - s + \mu_i(k, s, T)} - c\mu_i(k, s, T). \quad (65)$$

We will show likewise that at each decision epoch, there is an upper bound to the number of resources that the DM shall assign (optimally) for the remainder of the time horizon. Having computed the terminal value function, we are now in a position to compute the value function at the previous decision epoch. Indeed, we have from (50):

$$V_i(k, s, T-1) = \max_{u \in [0, \min(k,s)]} \{R(s, u) + Q(k, s, u, T)\}, \quad (66)$$

$$k = 1, \ldots, M, s = 1, \ldots, n_i,$$

where the future expected reward associated with allocation u is given by:

$$Q(k, s, u, T) = \sum_{\ell=0}^{n_i - s + u} b(n_i - s + u, \ell, q_i) V_i(k - u, s - u + \ell, T) \quad (67)$$

We wish to show that the value function $V_i(k, s, T-1)$ has a threshold based analytical form similar to $V_i(k, s, T)$.

Case 1: $u < \kappa_i(T) - n_i + s$ and $k - u \geq \kappa_i(T)$. It follows that:

$$n - s + u - \ell < \kappa_i(T) \text{ and } n - s + k - \ell \geq \kappa_i(T) \forall \ell. \quad (68)$$

$$\Rightarrow \mu_i(k - u, s - u + \ell, T) = \kappa_i(T) - n_i + s - u + \ell. \quad (69)$$

So, we have:

$$\begin{aligned} Q(k, s, u, T) &= \sum_{\ell=0}^{n_i - s + u} b(n_i - s + u, \ell, q_i) V_i(k - u, s - u + \ell, T) \\ &= \sum_{\ell=0}^{n_i - s + u} b(n_i - s + u, \ell, q_i)\left[1 - c(\kappa_i(T) - n_i + s - u + \ell) - q_i^{\kappa_i(T)}\right] \\ &= 1 - c\kappa_i(T) - q_i^{\kappa_i(T)} + c\sum_{\ell=0}^{n_i - s + u} b(n_i - s + u, \ell, q_i)(n_i - s + u - \ell) \\ &= 1 - c\kappa_i(T) - q_i^{\kappa_i(T)} + c\sum_{\ell=0}^{n_i - s + u} \binom{n_i - s + u}{\ell} q_i^\ell r_i^{n_i - s + u - \ell} (n_i - s + u - \ell) \\ &= 1 - c\kappa_i(T) - q_i^{\kappa_i(T)} cr(n_i - s + u)\sum_{\ell=0}^{n_i - s + u - 1} \binom{n_i - s + u - 1}{\ell} q_i^\ell r_i^{n_i - s + u - 1 - \ell} \\ &= 1 - c\kappa_i(T) - q_i^{\kappa_i(T)} + cr(n_i - s + u) \end{aligned} \quad (70)$$

Case 2: $n - s + k \leq \kappa_i(T)$. It follows that:

$$n - s + k - \ell \leq \kappa_i(T) \forall \ell. \quad (71)$$

$$\Rightarrow \mu_i(k - u, s - u + \ell, T) = k - u. \quad (72)$$

So, we have:

$$\begin{aligned} Q(k, s, u, T) &= \sum_{\ell=0}^{n_i - s + u} b(n_i - s + u, \ell, q_i) V_i(k - u, s - u + \ell, T) \\ &= \sum_{\ell=0}^{n_i - s + u} b(n_i - s + u, \ell, q_i)\left[1 - c(k - u) - q_i^{n_i - s + k - \ell}\right] \\ &= 1 - c(k - u) - \sum_{\ell=0}^{n_i - s + u} b(n_i - s + u, \ell, q_i) q_i^{n_i - s + k - \ell} \\ &= 1 - c(k - u) - \sum_{\ell=0}^{n_i - s + u} \binom{n_i - s + u}{\ell} q_i^\ell r_i^{n_i - s + u - \ell} q_i^{n_i - s + k - \ell} \\ &= 1 - c(k - u) - q_i^{n_i - s + k} \sum_{\ell=0}^{n_i - s + u} \binom{n_i - s + u}{\ell} r_i^{n_i - s + u - \ell} \\ &= 1 - c(k - u) - q_i^{n_i - s + k} (1 + r)^{n_i - s + u} \end{aligned} \quad (73)$$

It follows that:

$$R(s, u) + Q(k, s, u, T) = 2 - ck - q_i^{n_i - s + u} - q_i^{n_i - s + k}$$
$$(1 + r)^{n_i - s + u} \Rightarrow \Delta_{T-1}{}^i(k, u) = rq_i^{n_i - s + u}[1 - q^{k-u}]$$
$$(1 + r)^{n_i - s + u}]. \quad (74)$$

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
monitoring a condition of a physical asset comprising one or more subsystems connected in series, each subsystem comprising one or more components connected in parallel, the physical asset having one or more jobs and experiencing one or more shutdowns between consecutive operational periods, wherein monitoring the condition of the physical asset involves determining that the one or more subsystems are functioning properly;
determining a probability of the physical asset surviving a predetermined amount of time based on the monitoring and one or more shared resources, the one or more shared resources configured to be shared between the subsystems;
establishing a model using a threshold based heuristic maintenance policy and known failure rates of the one or more components, the model configured to maximize a number of successful jobs that the physical asset is able to complete based on the determined probability; and
mitigating downtime and a cost associated with shutdowns of the physical asset, including the one or more subsystems and the one or more components of each subsystem, by allocating the one or more shared resources to the one or more subsystems based on the model.

2. The method of claim 1, wherein the one or more jobs comprise one or more substantially identical jobs.

3. The method of claim 1, wherein the model comprises minimizing a shared resource cost.

4. The method of claim 3, wherein the shared resource cost is calculated using a Maximal Marginal Reward (MMR) algorithm that is configured to maximize an expected payout.

5. The method of claim 1, further comprising determining a maintenance schedule based on the model.

6. The method of claim 1, wherein monitoring the condition of the physical asset comprises determining if all subsystems are functioning.

7. The method of claim 1, wherein the one or more components are redundant within each subsystem.

8. The method of claim 1, wherein the shared resources comprise one or more of man hours and parts used to perform maintenance.

9. The method of claim 1, wherein the one or more shared resources comprise one or both of consumable resources and replenishable resources.

10. A system, comprising:
a processor; and
a memory storing computer program instructions which when executed by the processor cause the processor to perform operations comprising:
monitoring a condition of a physical asset comprising one or more subsystems connected in series, each subsystem comprising one or more components connected in parallel, the physical asset having one or more jobs and experiencing one or more shutdowns between consecutive operational periods, wherein monitoring the condition of the physical asset involves determining that the one or more subsystems are functioning properly;
establishing one or more consumable resources that are shared among the one or more subsystems;
determining a probability of the physical asset surviving a predetermined amount of time based on the monitoring and the one or more consumable resources;
establishing a model using a threshold based heuristic maintenance policy and known failure rates of the one or more components, the model configured to maximize a number of successful jobs that the physical asset is able to complete based on the determined probability; and
mitigating downtime and a cost associated with shutdowns of the physical asset, including the one or more subsystems and the one or more components of each subsystem, by allocating the one or more consumable resources to the one or more subsystems based on the model.

11. The system of claim 10, wherein the one or more jobs comprise one or more substantially identical jobs.

12. The system of claim 10, wherein the model comprises minimizing a shared resource cost.

13. The system of claim 12, wherein the shared resource cost is calculated using a Maximal Marginal Reward (MMR) algorithm that is configured to maximize an expected payout.

14. The system of claim 10, wherein the processor is configured to determine a maintenance schedule based on the model.

15. The system of claim 10, wherein monitoring the condition of the physical asset comprises determining if all subsystems are functioning.

16. The system of claim 10, wherein the one or more components are redundant within each subsystem.

17. The system of claim 10, wherein the one or more consumable resources comprise one or more of man hours and parts used to perform maintenance.

18. The system of claim 10, wherein the one or more consumable resources comprise replenishable resources.

* * * * *